(12) United States Patent
Vassilieff

(10) Patent No.: US 8,126,608 B2
(45) Date of Patent: Feb. 28, 2012

(54) METHOD FOR DETECTING THE MOTION OF A VEHICLE AND CORRESPONDING DEVICE

(75) Inventor: Youri Vassilieff, Toulouse (FR)

(73) Assignee: Continental Automotive France, Toulouse (FR)

( * ) Notice: Subject to any disclaimer, the term of this patent is extended or adjusted under 35 U.S.C. 154(b) by 502 days.

(21) Appl. No.: 12/360,992

(22) Filed: Jan. 28, 2009

(65) Prior Publication Data

US 2009/0192669 A1   Jul. 30, 2009

(30) Foreign Application Priority Data

Jan. 30, 2008  (FR) ...................................... 08 00479

(51) Int. Cl.
*B60C 23/00* (2006.01)
(52) U.S. Cl. ............................ 701/29; 340/442; 340/443
(58) Field of Classification Search ............... 701/29–36; 340/445–448, 442, 443
See application file for complete search history.

(56) References Cited

U.S. PATENT DOCUMENTS

| | | | |
|---|---|---|---|
| 6,265,867 B1 * | 7/2001 | Fowler | 324/207.25 |
| 6,498,474 B1 * | 12/2002 | Turner | 324/165 |
| 7,646,195 B2 * | 1/2010 | Salfelner | 324/244 |
| 2006/0132356 A1 | 6/2006 | Dulac | |
| 2006/0142911 A1 | 6/2006 | Allaird | |
| 2006/0152212 A1 | 7/2006 | Beranger | |
| 2009/0144017 A1 * | 6/2009 | Penot et al. | 702/150 |

FOREIGN PATENT DOCUMENTS

| | | |
|---|---|---|
| EP | 1669221 | 6/2006 |
| EP | 1669222 | 6/2006 |
| EP | 1800913 | 6/2007 |
| FR | 2856145 | 12/2004 |

OTHER PUBLICATIONS

Priority Search Report dated Sep. 29, 2008, in priority application.

* cited by examiner

*Primary Examiner* — Paul N Dickson
*Assistant Examiner* — Timothy Wilhelm
(74) *Attorney, Agent, or Firm* — Young & Thompson

(57) ABSTRACT

A method of detecting the motion of a vehicle (13) of which at least one wheel unit (11) of said vehicle is equipped with a motion detection element (D) that generates a motion signal (20) when the vehicle is in motion, including: establishing (19) a collection of characteristics of parasitic signals (Sp) stored in the wheel unit; comparing each motion signal (20) from the wheel unit (11) against the collection (19) of parasitic signals (Sp) stored in memory; and sending to a vehicle central processing unit (17) only those wheel unit signals (16) that are not present in the collection of parasitic signals.

19 Claims, 2 Drawing Sheets

Figure 1:
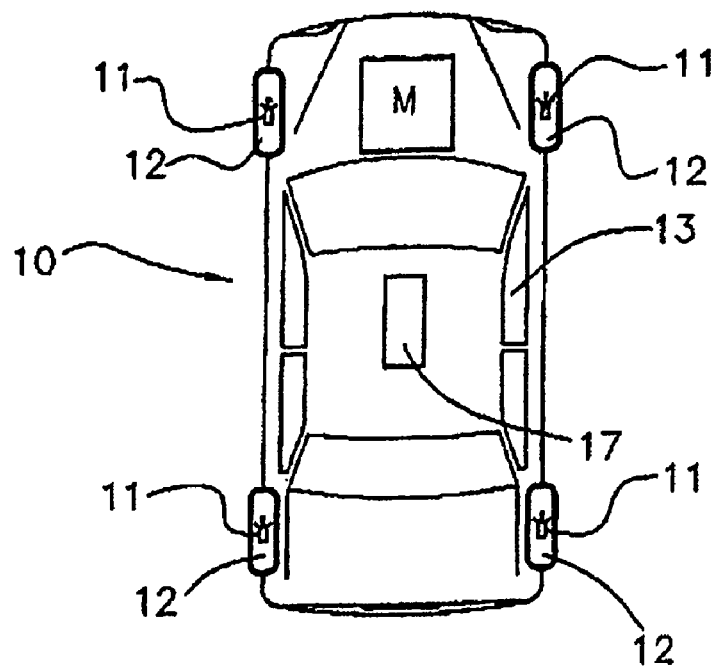

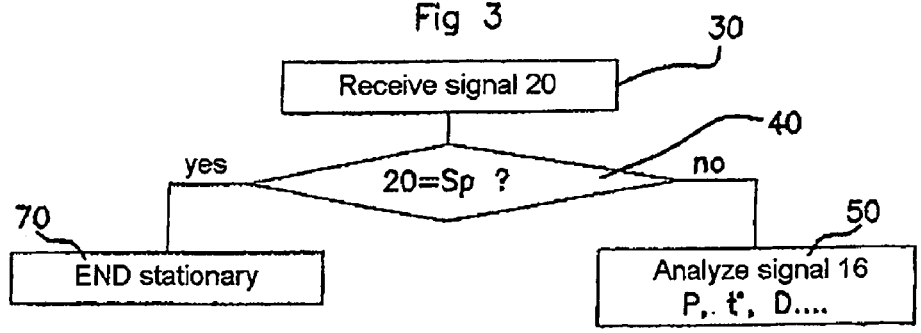
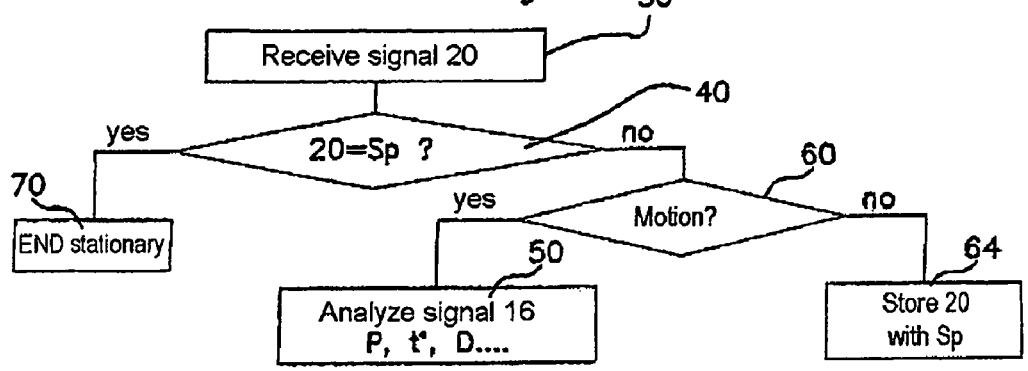
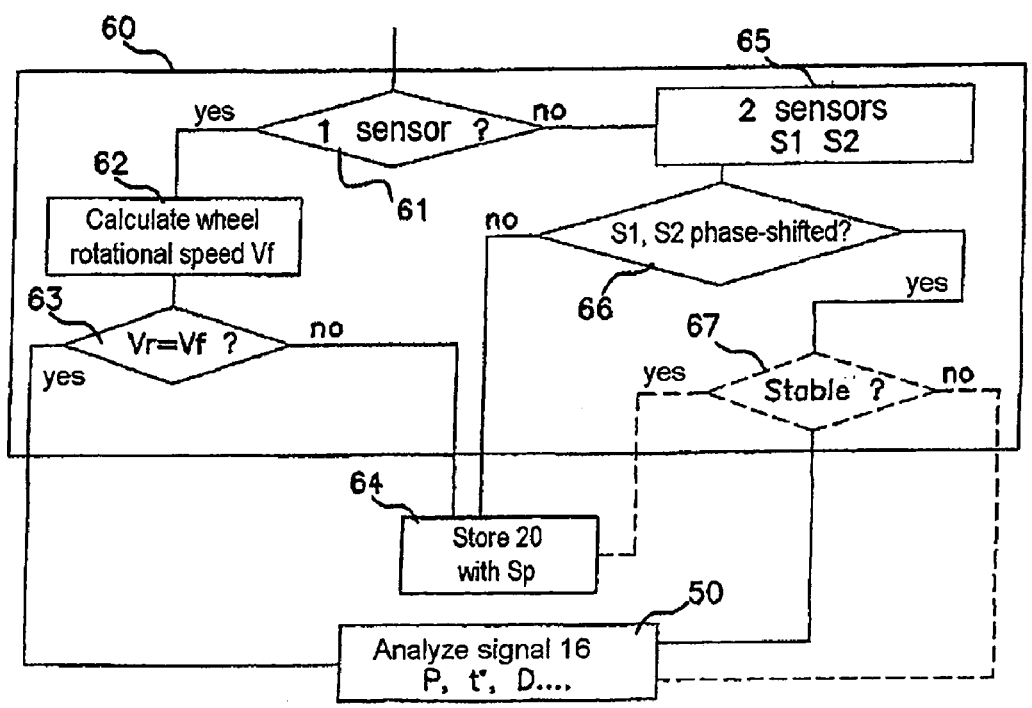

METHOD FOR DETECTING THE MOTION OF A VEHICLE AND CORRESPONDING DEVICE

BACKGROUND OF THE INVENTION

1. Field of the Invention

The present invention relates to the automotive field. More specifically, the invention relates to a method of detecting the motion of a vehicle and to a corresponding device, used in conjunction with a system for monitoring tire pressure.

2. Description of the Related Art

Conventionally, in order to monitor vehicle wheel tire pressures, each wheel is equipped with a wheel unit. This wheel unit is, for example, attached to the valve of the tire and is held firmly against the rim on the inside of the tire.

In a known way, each wheel unit comprises at least one pressure sensor capable of monitoring the pressure obtained inside the tire. The information relating to the pressure is then sent, via a wireless communications means, to a central processing unit situated inside the vehicle. The pressure measurements are analyzed and processed by this central processing unit.

In order that the information from the pressure sensors can be processed at a higher frequency when the vehicle is in motion, it is known practice for the vehicles to be fitted with a motion sensor. This is because rapid processing of defective-pressure information is of key importance if the vehicle is in motion. When the vehicle is stationary, this information do not need to be processed quite so urgently. It is commonplace for information from the tire pressure monitoring system to be processed at two different paces according to whether or not the vehicle is in motion.

In order to determine whether the vehicle is moving or stationary it is commonplace for at least one wheel unit to be equipped with a vehicle motion detection means. Advantageously, the information obtained by the motion detection means mounted in the wheel is transmitted by the very same wireless communications means as is used for the tire pressure. This information is analyzed by the central processing unit.

It is also known practice for the vehicle to be equipped with a motion detection means independent of the wheel unit. However, that solution is of little advantage in terms of cost.

One known motion detection means consists, for example, of an accelerometer mounted in the wheel unit. Indeed the acceleration to which a wheel is subjected is directly dependent on whether (or not) this wheel is rotating. However, accelerometers are highly sensitive to temperature variations and, as a result, temperature compensation has to be provided in order to correct the accelerometer measurements, making accelerometers expensive and complicated to use.

In order to detect quickly the onset of vehicle motion, the central processing unit regularly monitors the information from the wheel unit. This monitoring and the processing of the corresponding data are carried out approximately every 10 seconds whether or not the vehicle is stationary. As a result, there is a risk that the vehicle battery will be run down prematurely if the vehicle remains stationary for a long period. The use of an accelerometer by way of a vehicle motion detection means therefore proves to be a means that is expensive and not very economical with energy.

In order to detect vehicle motion it is also known practice for at least one wheel unit to be equipped with a sensor that senses the earth's magnetic field, such as an electromagnetic coil for example, these being particularly inexpensive. What happens is that when the vehicle is stationary, the earth's magnetic field as measured by the wheel unit is substantially constant. By contrast, when the vehicle is in motion, the wheels are rotated and the magnetic sensor situated in the wheel detects variations in the earth's magnetic field. It is thus easy to determine whether or not the vehicle is in motion simply by monitoring whether or not the magnetic-field sensor is detecting variations in the magnetic field.

Unfortunately, there are numerous parasitic signals that may be interpreted by the wheel unit as an indication that the vehicle is in motion. Specifically, when a vehicle is stationary near to something that generates parasitic signals, the magnetic sensor may be sensitive to these parasitic signals and send the wheel unit microprocessor a signal (believing it to be a measurement indicating that the vehicle is actually in motion) even though in fact it is merely a disruption to the magnetic field due to a parasitic generator. When this happens, the central processing unit mounted in the vehicle has to process this parasitic signal. The best possible outcome is that, having processed it, it may realize that this was a parasitic signal and disregard it. However, it may just as easily not realize it and send incorrect information to the driver. In both instances, it is a needless expenditure of energy for processing the parasitic signal, which thus carries the risk of running down the vehicle battery.

Items that generate parasitic signals, in respect of magnetic sensors, are in fact relatively commonplace and are all the more disruptive when the vehicle is stationary. What happens in such circumstances is that the generator continuously disrupts the motion detection means and the vehicle central processing unit is constantly and needlessly having to process signals that have nothing to do with vehicle motion. Generators such as this may, for example, be a washing machine or a refrigerator positioned in a garage beside the vehicle. They may also be electromagnetic waves due to the proximity of an electric socket (220 V at 50 Hz or at 60 Hz). The vehicle may also be disturbed when stationary if parked near an electrical transformer, near a high tension cable, near a tramway, etc. In the case of a tramway for example, the magnetic field induced is a field that varies at about 16 Hz. A field such as this may be interpreted, incorrectly, as being associated with the vehicle moving at a speed of 110 km/h.

SUMMARY OF THE INVENTION

It is an object of the present invention to propose a method for detecting vehicle motion using at least one sensor that senses the earth's magnetic field and a corresponding device that makes it possible to eliminate needless analyses of signals that are due to parasitic fields.

To this end, the method for detecting the motion of a vehicle according to the invention consists in:
 equipping at least one wheel unit of a vehicle with a motion detection means that generates a motion signal when the vehicle is in motion,
 establishing a collection of characteristics of parasitic signals stored in the wheel unit,
 comparing each motion signal (from the motion sensor) from the wheel unit against the collection of parasitic signals stored in memory, and
 sending to the vehicle central processing unit only those signals that are not present in the collection of parasitic signals.

More specifically, the present invention proposes, prior to the step of sending the signal to the central processing unit, checking that this signal is actually representative of vehicle motion. Thus, the parasitic signals are no longer needlessly analyzed by the central processing unit.

According to a first embodiment of the method according to the invention, use is made, by way of motion sensor, of a single magnetic sensor in the wheel unit and a check is carried out to ensure that the variation in magnetic field as measured by this sensor is indeed representative of vehicle motion by, for example, making sure that the rotational speed of the wheel (as deduced from the nominal frequency of the magnetic field) corresponds to a plausible wheel speed. For example, a check is carried out to ensure that there is no excessively abrupt change in speed value or no excessively stable low speed.

According to a second embodiment of the invention, two magnetic sensors, of which the directions in which the earth's magnetic field is measured do not coincide, are positioned in the wheel unit by way of motion sensors. The wheel unit microprocessor checks that the signals generated by these two sensors are phase-shifted relative to one another. If there is indeed a phase shift between the two signals, that means that the vehicle is in motion. In that case, the motion signal is associated with the signals delivered by the pressure and temperature (etc.) sensors in order to form the wheel unit signal sent to the central processing unit. The central processing unit then processes in some depth the signal it has received.

If there is no phase shift between the signals from the two sensors then these signals are not representative of motion but are parasitic signals. They are then stored in memory as parasitic signals in the parasitic signals database (if they are not already in this database) and, in order not to use up battery resources on needless calculations, they are not processed by the wheel unit computer in any greater depth.

It will be noted that, according to the present invention, it is not enough to detect a variation in the earth's magnetic field from the wheel unit sensor or sensors in order to deduce therefrom that the wheel is in motion. Indeed the wheel unit microprocessor confirms that the vehicle really is in motion by also checking that the signals from the motion sensor correlate with the rotational speed of the wheel or that the signals from the two magnetic sensors are phase-shifted relative to one another.

To complete this confirmation, it is also possible to check that these signals are phase-shifted in a stable and constant manner (corresponding to the angle between the axes of sensitivity of the magnetic sensors). Thus, two separate means are used to determine that the vehicle is in motion and the central processing unit then processes only those motion signals that have been double-confirmed. This then prevents the central processing unit from having needlessly to process parasitic signals. Battery power is thus economized.

Advantageously, in order to store the parasitic signals in the parasitic signals database, some of their characteristics, such as their amplitudes and/or the area under the curves representing these signals, are stored in memory.

Advantageously, the database that lists the collection of parasitic signals is thus constantly updated, throughout the life of the vehicle, even though in practice it is of especial benefit to store the characteristics of the last parasitic signal detected because that is the one most likely to be encountered again.

The present invention also relates to a device implementing the method according to the invention. According to a first embodiment, this device comprises a single magnetic sensor.

According to a second embodiment, the device according to the invention comprises two magnetic sensors sensing the earth's field, the measurement axes of which do not coincide. These sensors are suited to measuring variations in the earth's magnetic field as caused by the rotation of the wheel that bears them. These sensors may be of any kind. They may be simple coils, but they may equally be Hall-effect sensors, giant magnetic resonance sensors, tunnel-magnetic resonance sensors, etc.

BRIEF DESCRIPTION OF THE DRAWING FIGURES

Figure 2:
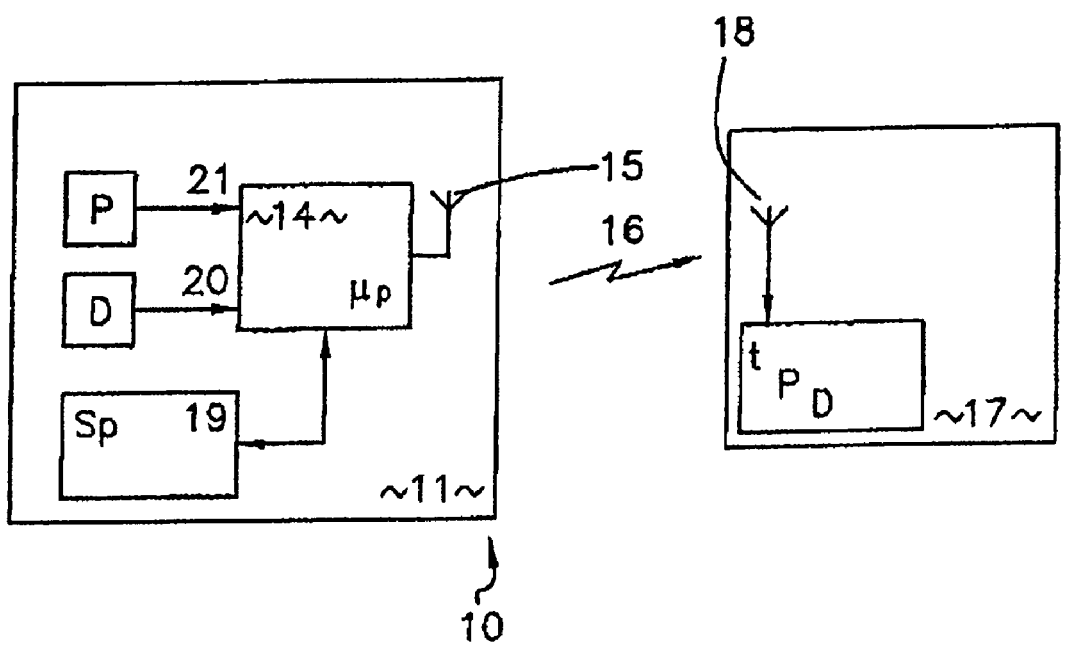

Further objects, features and advantages of the present invention will become apparent from reading the description which will follow, by way of nonlimiting example, and with reference to the attached drawings in which:

FIG. 1 is a schematic view of a motor vehicle fitted with a wheel unit and with a cabin central processing unit, FIG. 2 is a schematic view of a wheel unit and of a central processing unit according to the invention, FIG. 3 is a flow diagram illustrating the motion detection method of the invention, FIG. 4 is a flow diagram illustrating a motion detection method according to a first embodiment of the invention, and FIG. 5 is a flow diagram illustrating a second embodiment of the motion detection method according to the invention.

DETAILED DESCRIPTION OF THE INVENTION

According to the embodiment depicted in FIGS. 1 and 2, the device 10 for detecting the motion of a vehicle 13 according to the present invention comprises:
  a wheel unit 11, positioned in each of the wheels 12 of the vehicle 13, and
  a central processing unit 17 generally sited in the cabin of the vehicle.
Each wheel unit 11 comprises (FIG. 2):
  at least one pressure sensor P (and often also a temperature sensor (not depicted)), that generates a pressure signal 21,
  a motion sensor D consisting, in the context of a first embodiment, of a magnetic sensor designed to measure variations in the earth's magnetic field. It will in fact be recalled that when the wheel is stationary, the earth's magnetic field as measured by the motion sensor D is substantially constant. By contrast, as soon as the wheel starts to rotate, the motion sensor D measures variations in the earth's magnetic field (these variations in fact being due to the motion of the vehicle wheel in the earth's magnetic field). The motion sensor emits a motion signal 20 which may be either a true motion signal or a parasitic signal picked up by the motion sensor.
  a microprocessor 14 for processing and shaping the signals 20 and 21 generated by the pressure and motion sensors,
  a memory-storage means 19, associated with the microprocessor 14. This memory-storage means constitutes a database of parasitic signals Sp the known characteristics of which are logged. These characteristics consist, for example, of the amplitudes of the various parasitic signals or alternatively of the areas under their respective curves, or of any other similar parameter.
  an emission means 15 for emitting a wheel unit signal 16.
The wheel unit signal 16 (generated from, in particular, the signals from the pressure 21 and motion 20 sensors) is emitted by the antenna 15 and is received by the central processing unit 17, which for this purpose is equipped with receiving means 18.

It will be recalled that, when a sensor that senses the earth's magnetic field is used to detect the motion of a vehicle, the signal 20 from such a sensor may easily be disturbed by a great number of surrounding parasitic signals Sp. The object of the present invention is not to send every variation in the motion signal from the wheel unit to the central processing unit for processing. The desire is, thus, to avoid the central processing unit having needlessly to process a signal which in fact is not truly representative of vehicle motion.

It will be recalled that the items that generate parasitic signals are in fact relatively commonplace and numerous and are all the more disruptive when the vehicle is stationary. This is because in such instances the generator continuously disrupts the motion detection means and the vehicle is constantly and needlessly having to process signals that have nothing to do with vehicle motion. Generators such as this may, for example, consist of a washing machine or of a refrigerator positioned in the garage beside the vehicle. They may also be electromagnetic waves due to the proximity of an electric socket (220 V at 50 Hz or at 60 Hz). The vehicle may also be disturbed when stationary if parked near an electrical transformer or near to a high tension cable, or near a tramway line, etc. The disturbances induced by such parasitic generators are relatively well known and stored in memory in the database 19.

The method of detecting vehicle motion according to the invention therefore consists in (FIG. 3):

gathering (step 30) the motion signal 20 at the microprocessor 14, comparing (step 40) this motion signal 20 against the parasitic signals Sp stored in memory in the memory-storage means 19, and sending the wheel unit signal 16 (step 50) to the central processing unit 17 for processing only if the motion signal 20 incorporated into the wheel unit signal 16 is absent from the database that collates the known parasitic signals Sp. The processing operation(s) performed by the central processing unit 17 consists, for example, of extracting the pressure P, the temperature t°, the motion D, etc. from the wheel unit signal 16 so that it can be analyzed by a tire pressure monitoring device.

It will be noted that only those wheel unit signals 16 that are representative of actual vehicle motion are processed by the central processing unit. This then avoids the central processing unit processing means being used on signals that are not representative of actual vehicle movement.

If the motion signal 20 (step 40) is contained in the database of parasitic signals Sp then the microprocessor 14 does not send the signal 16 and waits for a subsequent signal (step 70). When this happens, the vehicle is then considered to be stationary and only substantial pressure variations are analyzed.

As a preference (FIG. 4) according to a first embodiment, when the motion signal 20 is not stored in memory (step 40) in the database of parasitic signals Sp, a check is carried out (step 60) prior to its being sent to the central processing unit 17, to ensure that it is indeed a signal representative of vehicle motion. If the signal is indeed representative of motion then it is sent to the central processing unit 17 of the vehicle (step 50) for in-depth analysis. By contrast, if the motion signal 20 is not representative of motion then it is stored (step 64) in the parasitic signals database. This is because in this instance, the motion signal 20 is a parasitic signal not yet stored in memory in the parasitic signals database 19.

It is thus possible to keep the database of parasitic signals encountered by the vehicle continuously updated.

The way in which the microprocessor 14 checks whether the motion signal 20 is indeed a signal representative of vehicle motion differs according to whether the motion sensor is one magnetic sensor or whether this motion sensor consists of a pair of magnetic sensors.

With reference to FIG. 5, when the motion sensor D consists of a single magnetic sensor (step 61), the microprocessor 14 calculates (step 62) the rotational speed of the wheel Vf (as deduced from the nominal frequency of the magnetic field). The microprocessor 14 then checks (step 63) that the calculated rotational speed Vf corresponds to a plausible wheel speed Vr (for example by checking that the rotational speed Vf does not vary too abruptly or alternatively is not excessively stable). If there is good correlation between these two wheel rotational speeds (Vf and Vr), the wheel unit signal 16 is sent to the central processing unit 17 for processing (step 50). If there is no correlation between the two wheel rotational speeds, then the motion signal 20 is stored (step 64) in memory in the database of parasitic signals Sp.

When the motion sensor D consists of a pair of magnetic sensors (step 65) of which the directions of measurement of the earth's magnetic field do not coincide (as a preference it is possible to use two sensors with measurement axes at 90° to one another), the microprocessor 14 checks (step 66) that the signals S1 and S2 generated by these two sensors are phase-shifted relative to one another. If there is indeed a phase shift between the two signals, this means that these are indeed motion signals. In such a case, the wheel unit signal 16 (that incorporates them) is processed in depth by the central processing unit 17 (step 50). If not, that means that these are not motion signals but parasitic signals. They are then stored in memory 19 (step 64) as parasitic signals in the parasitic signals database (if they are not already in this database).

FIG. 5 also illustrates, in dotted line, an alternative form of embodiment of the method according to the invention, using two magnetic sensors as motion sensors. In this alternative form, when a phase shift has been detected (step 66) between the signals S1 and S2, a further check is carried out to ensure that this phase shift is stable (step 67). If it is, then the signals S1 and S2 (that make up the motion signal 20) are stored in the parasitic signals database (step 64), and if not the wheel unit signal incorporating these signals is analyzed in depth (step 50) by the central processing unit.

This alternative form of embodiment proposes an additional step (step 67) of checking the continuity and stability of each signal (S1, S2). This additional step makes it possible to confirm with more certainty that the vehicle 10 is actually in motion. This is because the frequency of each signal varies with the speed of the vehicle. A signal that is stable in frequency and/or has no discontinuity (for example: a signal that is too purely sinusoidal) cannot be characteristic of the motion of a vehicle (the speed of which varies and the metallic masses of which deform the uniformity of the earth's magnetic field around the vehicle).

This additional step (step 67) therefore makes it possible to avoid errors in interpreting the motion of the vehicle 13 because when the vehicle 13 is stationary, if a rotating local field is superimposed in its vicinity, there is the risk that this will induce a phase shift between the two signals (S1, S2) that is similar to the phase shift induced by a rotating wheel 12. The assessment of whether the vehicle 13 is in motion could therefore be impaired. The additional step 67 makes it possible to solve this problem which, admittedly, occurs only infrequently.

Thus, the present invention makes it possible to limit considerably the number of full and periodic analyses of each signal (S1, S2) from the magnetic sensors, thanks to two consecutive and essential steps:

a first step known as the "identity condition" (step 40) which is able to determine, from a database 19 of known parasitic signals Sp, whether each signal S1, S2 (or 16) is already known and listed as a parasitic signal. If it is, the analysis is halted. The vehicle is then considered to be stationary.

A second step known as the "phase shift analysis" (step 66) that analyzes the phase shift between the two signals (S1, S2).

Of course, the present invention is not restricted to the preferred embodiment described hereinabove by way of non-limiting example. For example, the step 67 of checking the continuity and stability of each signal (S1, S2) may be carried out prior to the analysis (step 66) of the phase shift between the two signals (S1, S2).

The invention claimed is:

1. A method of detecting the motion of a vehicle (13) of which at least one wheel unit (11) of said vehicle is equipped with a means for motion detection (D) that generates a motion signal (20) when the vehicle is in motion, comprising:
    establishing (19) a collection of characteristics of parasitic signals (Sp) stored in the wheel unit;
    comparing each motion signal (20) from the wheel unit (11) against the collection (19) of parasitic signals (Sp) stored in memory; and
    sending to a vehicle central processing unit (17) only those wheel unit signals (16) that are not present in the collection of parasitic signals,
    wherein in order to establish the collection (19) of characteristics of the parasitic signals (Sp), the motion signals (S1, S2) that do not display any phase shift are stored in memory by way of the parasitic signals (Sp).

2. The method of detecting the motion of a vehicle as claimed in claim 1, wherein prior to the step whereby the central processing unit (17) processing the wheel unit signal (16), a check is carried out to ensure that this signal does actually represent motion (step 60) of the vehicle.

3. The detection method as claimed in claim 2, wherein in order to establish that the wheel unit signal (16) does represent vehicle motion:
    two magnetic sensors (D) of which the directions in which the magnetic field is measured do not coincide are positioned in the wheel unit, said sensors (D) delivering two motion signals (S1, S2),
    a microprocessor (14) positioned in the wheel unit checks that the signals (S1, S2) generated by the two sensors are phase-shifted relative to one another and
    when the signals sent by the sensors are phase-shifted, this is used to deduce that the wheel unit signal (16) does indeed represent vehicle motion.

4. The method of detecting vehicle motion as claimed in claim 3, wherein in order to establish the collection (19) of characteristics of the parasitic signals (Sp), the motion signals (S1, S2) that do not display any phase shift are stored in memory by way of the parasitic signals (Sp).

5. A device for detecting vehicle motion employing the method as claimed in claim 4, said device being installed in a wheel unit (11) of a motor vehicle, said device comprising:
    means for generating a motion signal (20) when the vehicle is in motion,
    means for memory (19) for storing a collection of characteristics of parasitic signals (Sp) in a wheel unit (11),
    means for comparing the motion signal (20) against the parasitic signals (Sp), and
    means for a central processing unit (17) positioned in the vehicle to process a wheel unit signal (16) when it differs from the parasitic signals (Sp) stored in memory.

6. A device for detecting vehicle motion employing the method as claimed in claim 3, said device being installed in a wheel unit (11) of a motor vehicle, said device comprising:
    means for generating a motion signal (20) when the vehicle is in motion,
    means for memory (19) for storing a collection of characteristics of parasitic signals (Sp) in a wheel unit (11),
    means for comparing the motion signal (20) against the parasitic signals (Sp), and
    means for a central processing unit (17) positioned in the vehicle to process a wheel unit signal (16) when it differs from the parasitic signals (Sp) stored in memory.

7. The method of detecting vehicle motion as claimed in claim 2, wherein in order to establish the collection (19) of characteristics of the parasitic signals (Sp), the motion signals (S1, S2) that do not display any phase shift are stored in memory by way of parasitic signals (Sp).

8. A device for detecting vehicle motion employing the method as claimed in claim 7, said device being installed in a wheel unit (11) of a motor vehicle, said device comprising:
    means for generating a motion signal (20) when the vehicle is in motion,
    means for memory (19) for storing a collection of characteristics of parasitic signals (Sp) in a wheel unit (11),
    means for comparing the motion signal (20) against the parasitic signals (Sp), and
    means for a central processing unit (17) positioned in the vehicle to process a wheel unit signal (16) when it differs from the parasitic signals (Sp) stored in memory.

9. A device for detecting vehicle motion employing the method as claimed in claim 2, said device being installed in a wheel unit (11) of a motor vehicle, said device comprising:
    means for generating a motion signal (20) when the vehicle is in motion,
    means for memory (19) for storing a collection of characteristics of parasitic signals (Sp) in a wheel unit (11),
    means for comparing the motion signal (20) against the parasitic signals (Sp), and
    means for a central processing unit (17) positioned in the vehicle to process a wheel unit signal (16) when it differs from the parasitic signals (Sp) stored in memory.

10. The detection device as claimed in claim 9, wherein the means for memory (19) for storing the parasitic signals is designed to store the amplitudes and/or the areas of said parasitic signals.

11. The method as claimed in claim 1, wherein the memory-storage of the parasitic signals (Sp) includes storing the amplitudes (A) and/or areas of said parasitic signals.

12. A device for detecting vehicle motion employing the method as claimed in claim 11, said device being installed in a wheel unit (11) of a motor vehicle, said device comprising:
    means for generating a motion signal (20) when the vehicle is in motion,
    means for memory (19) for storing a collection of characteristics of parasitic signals (Sp) in a wheel unit (11),
    means for comparing the motion signal (20) against the parasitic signals (Sp), and
    means for a central processing unit (17) positioned in the vehicle to process a wheel unit signal (16) when it differs from the parasitic signals (Sp) stored in memory.

13. A device for detecting vehicle motion employing the method as claimed in claim 1, said device being installed in a wheel unit (11) of a motor vehicle, the device comprising:
    means for generating a motion signal (20) when the vehicle is in motion,
    means for memory (19) for storing a collection of characteristics of parasitic signals (Sp) in the wheel unit (11), means for comparing the motion signal (20) against the parasitic signals (Sp), and means for a central processing unit (17) positioned in the vehicle to process a wheel unit signal (16) when it differs from the parasitic signals (Sp) stored in memory.

14. The device for detecting vehicle motion as claimed in claim 13, wherein the device further comprises means for checking that the motion signal (20) does indeed represent vehicle motion.

15. The vehicle motion detection device as claimed in claim 14, wherein the wheel unit (11) comprises two magnetic sensors (D) positioned in such a way that their magnetic field measurement directions do not coincide, and in that the checking means in a microprocessor (14) of the wheel unit comprises a means of determining a phase shift between the signals (S1 and S2) measured by the sensors.

16. The detection device as claimed in claim 15, wherein the means for memory (19) for storing the parasitic signals is designed to store the amplitudes and/or the areas of said parasitic signals.

17. The detection device as claimed in claim 14, wherein the means for memory (19) for storing the parasitic signals is designed to store the amplitudes and/or the areas of said parasitic signals.

18. The detection device as claimed in claim 13, wherein the means for memory (19) for storing the parasitic signals is designed to store the amplitudes and/or the areas of said parasitic signals.

19. A method of detecting the motion of a vehicle (13) of which at least one wheel unit (11) of said vehicle is equipped with motion detector (D) that generates a motion signal (20) when the vehicle is in motion, comprising:
  establishing (19) a collection of characteristics of parasitic signals (Sp) stored in the wheel unit;
  comparing each motion signal (20) from the wheel unit (11) against the collection (19) of parasitic signals (Sp) stored in memory; and
  sending to a vehicle central processing unit (17) only those wheel unit signals (16) that are not present in the collection of parasitic signals,
wherein in order to establish the collection (19) of characteristics of the parasitic signals (Sp), the motion signals (S1, S2) that do not display any phase shift are stored in memory by way of the parasitic signals (Sp).

* * * * *